Patented Mar. 17, 1931

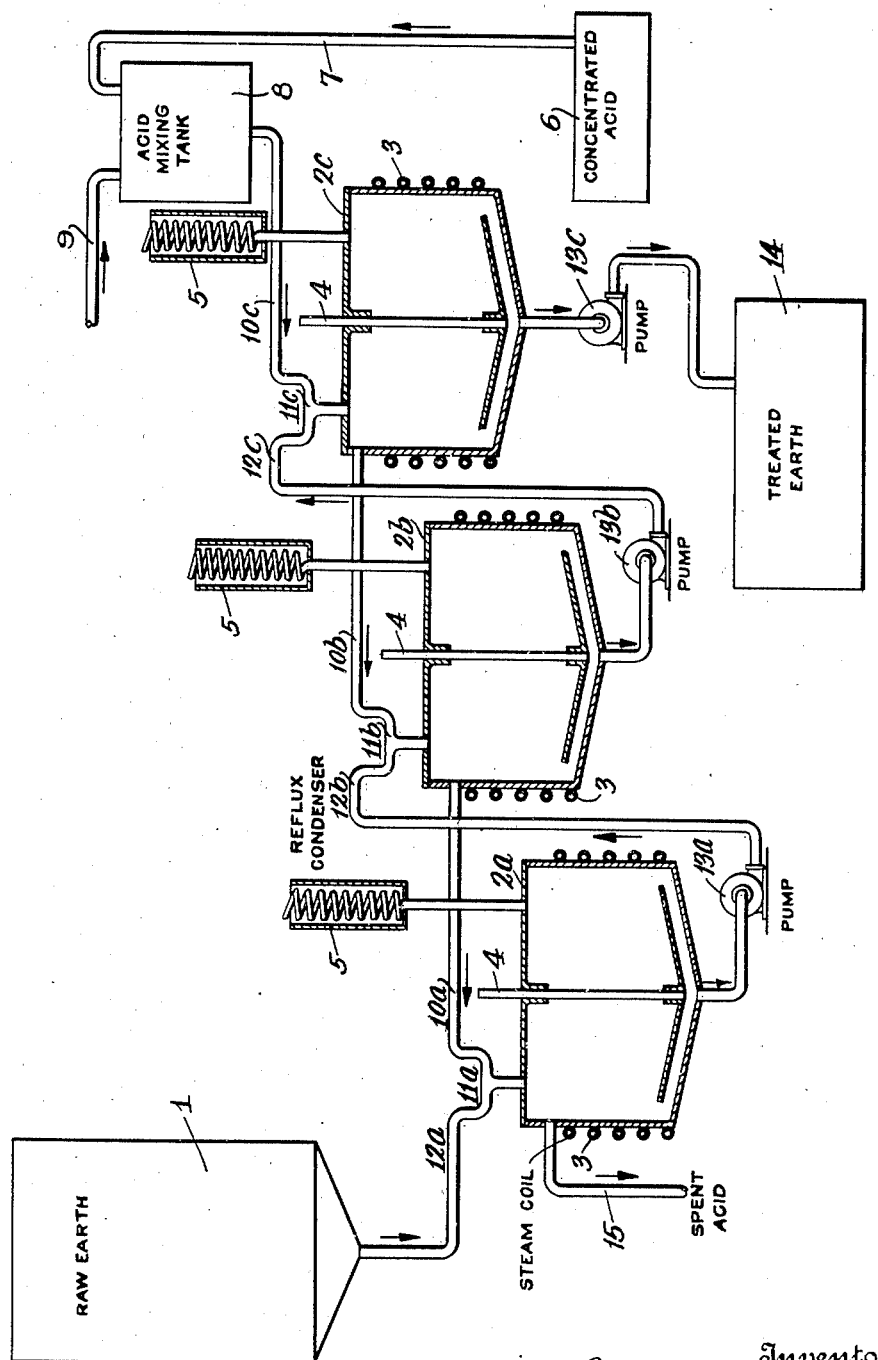

1,796,799

UNITED STATES PATENT OFFICE

ROBERT E. MANLEY AND MERTON L. LANGWORTHY, OF PORT ARTHUR, TEXAS, ASSIGNORS, BY MESNE ASSIGNMENTS, TO THE TEXAS COMPANY, OF NEW YORK, N. Y., A CORPORATION OF DELAWARE

PREPARATION OF ADSORBENT MATERIAL

Application filed October 20, 1926. Serial No. 142,835.

This invention relates to the preparation of solid adsorbent material and has particular reference to the treatment of clays and like earthy materials for the production of adsorbent material adapted for decolorizing and neutralizing hydrocarbon or other oils.

Described generally, the invention involves the treatment of a suitable clay with an aqueous solution of a mineral acid whereby certain constituents of the clay are dissolved and removed in solution, leaving an active adsorbent structure in the treated clay. The practice of the invention makes possible an economical activation of clay wherein any desired degree of activation up to the highest possible is accomplished at a minimum expense.

In the refining of both vegetable and mineral oils it is often necessary to treat the oil with an adsorbent earth or clay in order to remove certain colored constituents occurring in the oil. Such earth or clay is usually known as fuller's earth and this term in connection with oil refining is generally understood to designate any naturally occurring earthy material which, when properly dried and pulverized, has the power to decolorize oils with which it is brought in contact. More recently it has been discovered that certain clays may be greatly improved as regards decolorizing properties by treatment with a mineral acid which dissolves a portion of the constituent parts of the clay. Although the exact change which takes place in such clays as a result of treatment with acids is not known it seems probable that the acid attacks and dissolves certain of the metal compounds and thus develops a porous active surface upon or in the particles of clay.

The acid treatment of decolorizing clays as previously practiced commercially usually consists in grinding the clay to a fine powder which is then treated with a concentrated solution of sulfuric acid. The mixture of clay and acid is usually heated for several hours at about the boiling temperature of water until the acid practically ceases to act upon the clay. The remaining acid, together with the dissolved metal salts, is then decanted and the clay is washed until approximately free from acid. After drying and grinding the clay is ready for use. While such treatment will in many instances greatly increase the decolorizing power of certain clays, it is a somewhat inefficient method of operation in that the acid fails to react to completion. This may be due to considerable extent to the formation of a concentrated solution of the highly ionized salts formed by the action of the acid upon the acid-soluble constituents of the clay and we have determined by experiment that when approximately one-half, to three-fourths of the acid has reacted, a condition of equilibrium is reached, after which the reaction progresses no further. At any rate it has been found that the usual procedure which has been outlined fails to obtain the greatest efficiency in the finished clay and is wasteful due to the fact that a considerable portion of the acid fails to react with the clay and is therefore lost.

Furthermore, in the batch method of treatment in common use, the clay may not be activated to the fullest extent possible, a considerable portion of the acid-soluble constituents remaining undissolved due to the equilibrium conditions which exist and which were referred to in the foregoing paragraph. In the case of certain clays it may be desirable to effect a more thorough removal of the acid-soluble constituents than is possible by the batch methods described before, thereby producing a finished decolorizing material which has a maximum decolorizing value.

The application of our invention to the treatment or activation of certain clays with acid makes possible the most complete utilization of the acid employed and also makes possible a substantially complete removal of acid-soluble constituents from the clay. The invention provides a process which is far more economical than the methods hitherto employed and which results in the production, from a given earth, of the most efficient decolorizing material at the lowest cost. The invention may be more readily understood from the following description in connection with the accompanying drawing, in which is illustrated a diagrammatic elevation of apparatus suitable for carrying on the process disclosed, it being understood that any other form of suitable apparatus may be used in carrying out the process.

Referring to the drawing, reference numeral 1 indicates a storage container for raw earth from which earth is supplied to the first of a series of treating vessels 2a, 2b, 2c, etc. of the type usually known as thickeners. The treating vessels are fitted with suitable means for maintaining an elevated temperature therein, such as the steam coils 3. The individual treating vessels are also fitted with suitable stirring means 4 and reflux condensers 5. A storage tank 6 is provided as a source of concentrated sulfuric acid and is connected by the line 7 to a mixing tank 8, wherein the acid may be diluted to any desired strength by the addition of water from any suitable source 9. The fresh diluted acid is introduced into the treating vessel 2c at the opposite end of the series to which the raw earth is introduced, by means of the line 10c.

Each of the treating vessels 2a, 2b, 2c, etc. are fitted with a distributing and mixing device 11a, 11b, 11c, etc. into which earth and acid are simultaneously introduced through lines 12a, 12b, 12c, etc. and 10a, 10b, 10c, etc. respectively. Clay settling in the bottom of the treating vessels is pumped to the next succeeding treating vessel by means of the pumps 13a and 13b, until reaching the last of the series of treating vessels when the treated clay is pumped by means of the pump 13c to the storage bin represented by the numeral 14. Acid solution is decanted from 2c through the line 10b into 2b, and from 2b through the line 10a into 2a, during which time the acid solution becomes progressively weaker until it is discharged practically fully spent from 2a through the line 15.

The method of treating clay with acid in connection with the apparatus shown may be as follows:

The raw clay is stored in a storage bin 1 from which during the treating operation it is transferred continuously into the first of a series of treating vessels 2a. The clay may be pulverized before introduction into the treating system but it has been found that most clays of the type suitable for the production of decolorizing material through acid treatment will form a plastic mud of substantially uniform consistency with the acid solution and that therefore pulverization prior to acid treatment may be unnecessary. In entering the treating vessel the clay and the acid solution decanted from the preceding vessel are thoroughly mixed by suitable means at 11a and thence pass into the vessel wherein settling and separation of the clay from the acid solution occurs.

The acid used in treating clays of the type under consideration is preferably sulfuric acid, although hydrochloric acid or other suitable mineral acid may be employed. Thus in the apparatus illustrated concentrated sulfuric acid from the tank 6 is pumped into a mixing tank 8 where it is diluted to the proper strength. Heretofore in the treatment of clays with acid to improve the decolorizing properties thereof it has been customary to use a concentrated solution of acid. However, our exhaustive experiments have shown that far better results may be obtained by using a much more dilute acid and with certain clays yielding extremely high decolorizing efficiencies on acid treatment it has been found that an aqueous solution containing about 4% to 12% by weight of sulfuric acid is preferable. The lower the acid strength the slower will be the reaction and it is of course desirable to use as strong acid as possible for this reason. On the other hand we have found that it is essential in obtaining highest efficiency in treating almost all clays with acid to use an acid solution not exceeding 20% by weight of sulfuric acid. In the process described herein the acid is diluted to about 8% to 10% before being introduced into the treating apparatus as it has been found by experiment that this concentration gives the best average results.

While the acid used in the treatment of clay has heretofore been substantially pure sulfuric acid, we have found that the purity of the acid is not an essential factor in the results obtained. In fact we have obtained excellent results in the treatment of clay with the acid recovered from the refining of petroleum, although such acid may be black in color and may contain a considerable quantity of dissolved organic material. The use of such acid may effect a distinct economy in the operation of a clay treating plant in connection with the refining of petroleum, as the acid used in the refining of the various oils may be diluted to remove insoluble sludge constituents, and may then be used in treating the clay without the expense of concentrating the acid to 60° or 66° Bé., as is the custom when the acid is to be recovered for further use on oil.

The raw clay introduced at one end of the treating system and the fresh dilute acid introduced at the opposite end of the system flow in counter-current relation to each other. Thus, during the flow of the clay through the system its acid-soluble constituents are progressively removed, while the acid solution during its flow through the system becomes progressively weaker and more heavily charged with the soluble salts extracted from the clay. By this method a substantially complete removal of the acid-soluble constituents of the clay may be effected with the corresponding highest increase in the decolorizing efficiency of the clay.

The treating vessels 2a, 2b, 2c, etc., in which the clay is actually in contact with the acid, are preferably enclosed and are maintained at an elevated temperature by means of the steam coils 3 or by other suitable means. It is desirable that the reaction be carried on at approximately the boiling temperature of the acid solution in the treating vessel. It is not desirable, however, for any portion of the water of this solution to be lost through vaporization which would result in a change in concentration of the acid present. Therefore, reflux condensers 5 are fitted to each treating vessel and these are so cooled as to condense and return steam to the contents of the vessel. The enclosed construction of the treating vessels together with the reflux condensers serves an additional purpose in preventing contact of the clay with air, since contact with air during treating may be detrimental to the quality of the product.

From the last of the series of treating vessels the clay is removed to storage. At this point in the process, there is absorbed in the clay a considerable quantity of the fresh acid with which it was in contact in the last treating vessel, which should be removed before the clay is suitable for use. The removal of this acid may preferably be accomplished by a counter-current system of washing with water in an apparatus similar to that used in treating the clay, water being used therein instead of the acid solution employed in treating. In order to avoid the loss of acid carried out in the last treating vessel by the treated clay, this clay may preferably be put through a suitable filter which should reduce the liquid content to such a degree as to produce a substantially dry and easily handled cake, after which the clay is washed as before described. The acid solution obtained from such filtering operation should be pumped to the treating vessel of the series preceding that from which the clay was withdrawn.

The treated clay after washing substantially free from acid may be partially dehydrated upon any suitable type of filter, such as a continuous or semi-continuous vacuum or pressure filter of any of the well known types. Further dehydration is effected by the application of heat, it being desirable however not to heat such acid-treated clay to an excessive degree. It has been found that in most cases temperatures of 250° to 350° F. should not be exceeded in the drying operation if damage to the clay is to be avoided. However, it may be advantageous in certain instances to omit drying the treated clay. For example, if the clay is to be utilized in purifying a higher viscosity lubricating oil, the clay may be mixed with the oil while still in the form of a mud. As the normal temperature of optimum decolorizing power of acid-treated clays, with respect to lubricating oils, will usually be in excess of 250° F., the water contained in the mud is rapidly evaporated. When handled in this manner, the expense of drying and pulverizing the treated clay is avoided.

Obviously many modifications and variations of the invention, as hereinbefore set forth, may be made without departing from the spirit and scope thereof, and therefore, only such limitations should be imposed as are indicated in the appended claims.

What we claim is:

1. The method of improving the property of clay to decolorize oil which comprises heating the clay with an aqueous solution of sulfuric acid having a concentration of about 10% by weight of sulfuric acid.

2. The method of improving the property of clay to decolorize and purify hydrocarbon oils which comprises heating the clay with an aqueous solution of sulphuric acid having a concentration within the range of 4 to 12% $H_2SO_4$.

3. The process of improving the property of clay to decolorize and purify hydrocarbon oil which comprises establishing a flow of clay through a treating apparatus and maintaining in contact therewith and at elevated temperature a counter-current flow of dilute sulphuric acid, having a concentration of approximately 10% by weight of $H_2SO_4$ and then separating the acid from the clay whereby constituents of the clay soluble in dilute acid are substantially removed.

In witness whereof we have hereunto set our hands this 30th day of September, 1926.

ROBERT E. MANLEY.
MERTON L. LANGWORTHY.